(12) United States Patent
Okada et al.

(10) Patent No.: US 7,505,843 B2
(45) Date of Patent: Mar. 17, 2009

(54) VEHICLE SAFETY APPARATUS

(75) Inventors: Reiko Okada, Tokyo (JP); Norihiro Naito, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 772 days.

(21) Appl. No.: 10/852,109

(22) Filed: May 25, 2004

(65) Prior Publication Data

US 2004/0254713 A1     Dec. 16, 2004

(30) Foreign Application Priority Data

Jun. 10, 2003   (JP) .............................. 2003-165348

(51) Int. Cl.
*B60Q 7/00* (2006.01)
(52) U.S. Cl. ........................................ 701/96; 342/354
(58) Field of Classification Search ................. 701/96, 701/200, 207, 300, 223, 301; 342/354, 357.01, 342/357.08, 371, 419; 340/438, 539.11, 340/539.23, 541
See application file for complete search history.

(56) References Cited

U.S. PATENT DOCUMENTS

| | | | | |
|---|---|---|---|---|
| 5,229,975 A | * | 7/1993 | Truesdell et al. ............. | 367/107 |
| 5,235,316 A | * | 8/1993 | Qualizza ..................... | 340/436 |
| 6,150,923 A | * | 11/2000 | Johnson et al. ........... | 340/384.6 |
| 6,788,189 B2 | * | 9/2004 | Kikkawa et al. ........... | 340/426.1 |
| 6,794,987 B2 | * | 9/2004 | Schiffmann et al. ......... | 340/435 |
| 6,879,247 B2 | * | 4/2005 | Shimomura et al. .... | 340/426.18 |
| 6,889,135 B2 | * | 5/2005 | Curatolo et al. ............. | 701/207 |
| 7,130,448 B2 | * | 10/2006 | Nagaoka et al. ............. | 382/104 |
| 2004/0021947 A1 | * | 2/2004 | Schofield et al. ............ | 359/601 |

FOREIGN PATENT DOCUMENTS

| | | |
|---|---|---|
| DE | 199 12 319 C1 | 10/2000 |
| EP | 1 172 269 A1 | 1/2002 |
| FR | 2 814 243 A1 | 3/2002 |
| JP | 01-153903 | 6/1989 |
| JP | 09-265585 | 10/1997 |
| JP | 10-154279 A | 6/1998 |
| JP | 11-134581 | 5/1999 |
| JP | 2003-054370 | 2/2003 |
| JP | 2003-157483 | 5/2003 |

OTHER PUBLICATIONS

Japanese Office Action dated Apr. 22, 2008, with a complete English lanuage translation.

* cited by examiner

*Primary Examiner*—Dalena Tran
(74) *Attorney, Agent, or Firm*—Sughrue Mion, PLLC

(57) ABSTRACT

When a detection unit (3) detects an approach of an object to a vehicle in which a vehicle safety apparatus is mounted, a main controller (2) determines whether a positional relationship between the vehicle and the detected object reaches a predetermined positional one. The main controller (2) can start a warning unit according to a determination result obtained thereby, and can issue a warning before the vehicle gets damaged.

11 Claims, 6 Drawing Sheets

VEHICLE SAFETY APPARATUS

BACKGROUND OF THE INVENTION

1. Field of the Invention

The present invention relates to a vehicle safety apparatus for ensuring the safety of a vehicle, and, more particularly, to a vehicle safety apparatus for preventing a vehicle from theft or the like.

2. Description of Related Art

In recent years, there is a trend toward vehicle safety apparatus for ensuring the safety of a vehicle in vehicles, such as a prevention of a theft of a vehicle. Such a conventional vehicle safety apparatus (for example, a vehicle antitheft device) is so constructed as to issue a warning or the like when certain damage is inflicted on a vehicle or vehicle-mounted equipment or an accident occurs in the vehicle.

As a vehicle antitheft device, there has been proposed a device for turning on a display for use in electronic equipment mounted in a vehicle when detecting an occurrence of an accident in the vehicle (refer to Japanese patent application publication (TOKKAIHEI) No. 10-154279 (paragraphs (0009) to (0015) and FIGS. 1 and 2), for example). Concretely, when detecting an occurrence of an accident in the vehicle, the vehicle antitheft device disclosed in Japanese patent application publication No. 10-154279 switches the display of the vehicle-mounted equipment into on state, maximizes the brightness of the display, and then displays a white image on the display. Furthermore, when the abnormal state lasts for a predetermined time period, the vehicle antitheft device displays a word of warning on the display while blinking the display.

When the abnormal state further continues, the vehicle antitheft device causes all circuits to fully operate while driving all motors mounted in the vehicle-mounted equipment. The vehicle antitheft device them picks up an image of the inside of the vehicle by using a camera, stores the image in a memory, displays the image on the display.

Thus, when detecting an occurrence of an accident in the vehicle, the vehicle antitheft device disclosed in Japanese patent application publication No. 10-154279 issues an alarm that gradually increases in the degree of warning so as to prevent a theft of the vehicle or the vehicle-mounted device as long as the abnormal state continues.

Since the vehicle antitheft device, which has been provided as a conventional vehicle safety apparatus, is constructed as mentioned above, when the driver turns off an ignition switch, gets off the vehicle and locks the doors of the vehicle, the vehicle antitheft device starts operating and then determines whether an accident occurs by detecting whether or not a door is opened without any door key being used, or detecting a glass crack by using a shock sensor.

For this reason, the conventional vehicle safety apparatus operates after a thief has inflicted certain damage on the vehicle. In other words, a problem with the conventional vehicle safety apparatus is that while it can issue a warning or the like when a thief enters the vehicle, thereby producing an effect of preventing theft to a certain degree, it is difficult to effectively prevent a theft of the vehicle because a thief can start the engine of the vehicle and steal the vehicle in a short time.

Another problem with the conventional vehicle safety apparatus is that because it operates after an accident (or damage) has been inflicted on the vehicle (concretely, after a door or pane has been broken), while it can prevent the vehicle from theft, damage is inflicted on the vehicle itself.

A further problem with the conventional vehicle safety apparatus is that it only takes a theft-prevention measure, and cannot notify a positional relationship between the vehicle and an object (for example, another vehicle) to the driver in advance and therefore cannot ensure the safety of the vehicle.

SUMMARY OF THE INVENTION

The present invention is made in order to solve the above-mentioned problems, and it is therefore an object of the present invention to provide a vehicle safety apparatus that can effectively prevent a vehicle from theft without damage being inflicted on the vehicle itself.

It is another object of the present invention to provide a vehicle safety apparatus that can notify a positional relationship between a vehicle and an object in advance, thereby ensuring the safety of the vehicle.

In accordance with the present invention, there is provided a vehicle safety apparatus that when detecting an approach of an object to a vehicle and a positional relationship between the vehicle and the detected object reaches a predetermined reference one, gives a warning to the object. As a result, the vehicle safety apparatus can predict an accident that may occur in the vehicle in advance, thereby preventing the vehicle from theft or the like and ensuring the safety of the vehicle.

Further objects and advantages of the present invention will be apparent from the following description of the preferred embodiments of the invention as illustrated in the accompanying drawings.

DETAILED DESCRIPTION OF THE PREFERRED EMBODIMENTS

The preferred embodiments of the present invention will be now described with reference to the accompanying drawings.

Embodiment 1

Figure 1:
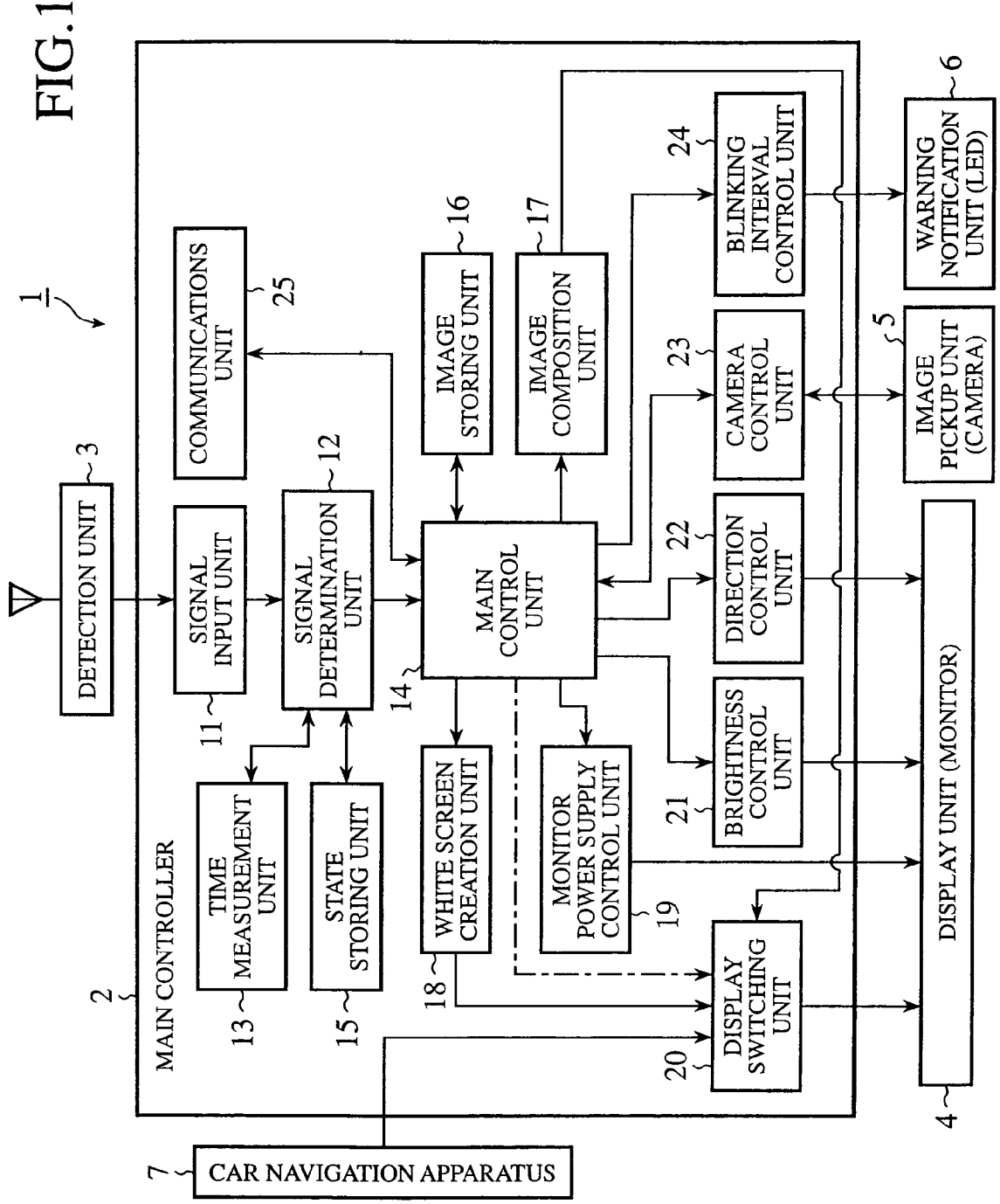
FIG. 1 is a block diagram showing a vehicle safety apparatus according to embodiment 1 of the present invention.

FIG. 1 is a block diagram showing an example of a vehicle safety apparatus according to embodiment 1 of the present invention. In FIG. 1, the vehicle safety apparatus 1 is attached to a vehicle (not shown) and is used in order to ensure the safety of the vehicle, such as to take a theft-prevention measure for the vehicle, as mentioned later. The vehicle safety apparatus 1 is provided with a main controller 2 connected with a detection unit (has a camera or an infrared sensor, for example) 3, a display unit (referred to as a monitor from here on) 4, an image pickup unit (or a camera) 5, and a warning notification unit (e.g., an LED) 6, and also connected with a car navigation apparatus 7. The vehicle safety apparatus shares the monitor 4 with the car navigation apparatus 7, and the camera 5 is so arranged as to pick up images of the inside and outside of the vehicle, as will be mentioned below. Two warning notification units 6 are arranged inside and outside the vehicle (e.g., one of them is disposed on an external face of the vehicle).

As shown in the figure, the main controller 2 is provided with a signal input unit 11, a signal determination unit 12, a time measurement unit 13, a main control unit 14, a state storing unit 15, an image storing unit 16, an image composition unit 17, a white screen creation unit 18, a monitor power supply control unit 19, a display switching unit 20, a brightness control unit 21, a direction control unit 22, a camera control unit 23, a blinking interval control unit 24, and a communications unit 25 (the main controller 2 simply includes the image storing unit 16, the image composition unit 17, the white screen creation unit 18, the direction control unit 22, and the communications unit 25 when needed, and these components are not used by the vehicle safety apparatus according to embodiment 1, as will be mentioned below). The monitor power supply control unit 19, the brightness control unit 21, and the direction control unit 22 control the electric power supply of the monitor 4, the brightness of the screen, and the attitude of the monitor 4 under control of the main control unit 14, respectively, as will be mentioned below.

The camera control unit 23 and the blinking interval control unit 24 control the camera 5 and the warning notification unit 6 under control of the main control unit 14, respectively. The monitor 4 is selectively connected to the car navigation apparatus 7 by the display switching unit 20. Threshold information set in advance is stored in the state storing unit 15 as state information (i.e., a reference value), and the state information can be changed by means of an input device not shown in the figure, for example. It is necessary for users to input a specific identification value (ID) in order to change the state information.

When the driver stops the vehicle and performs a predetermined operation (for example, the driver locks the doors of the vehicle by switching off an ignition key), the main control unit 14 detects this predetermined operation done by the driver and enters a first mode (for example, a theft-prevention mode), so that the vehicle safety apparatus 1 is brought to a standby state (i.e., a state in which the vehicle safety apparatus 1 can operate). At this time, the main control unit 14 controls the display switching unit 20 so as to connect the white screen creation unit 18 to the monitor 4. The vehicle safety apparatus 1 can be so constructed as to be manually turned on by the driver when the driver leaves the vehicle, for example. As a result, the vehicle safety apparatus 1 is brought to the standby state, and the white screen creation unit 18 is then connected to the monitor 4 by the display switching unit 20.

The driver can bring the vehicle safety apparatus 1 to the standby state (for example, an on state in which the vehicle safety apparatus 1 is turned on) when needed while the driver is driving the vehicle. While the driver is driving the vehicle, the main control unit 14 operates in a second mode (for example, a safety monitoring mode). The main control unit 14 can be so constructed as to detect the travel motion of the vehicle (that is, a state in which the ignition key is turned on and the engine is operating (or driven)), and to then operate in the second mode while the driver is driving the vehicle.

Figure 2:
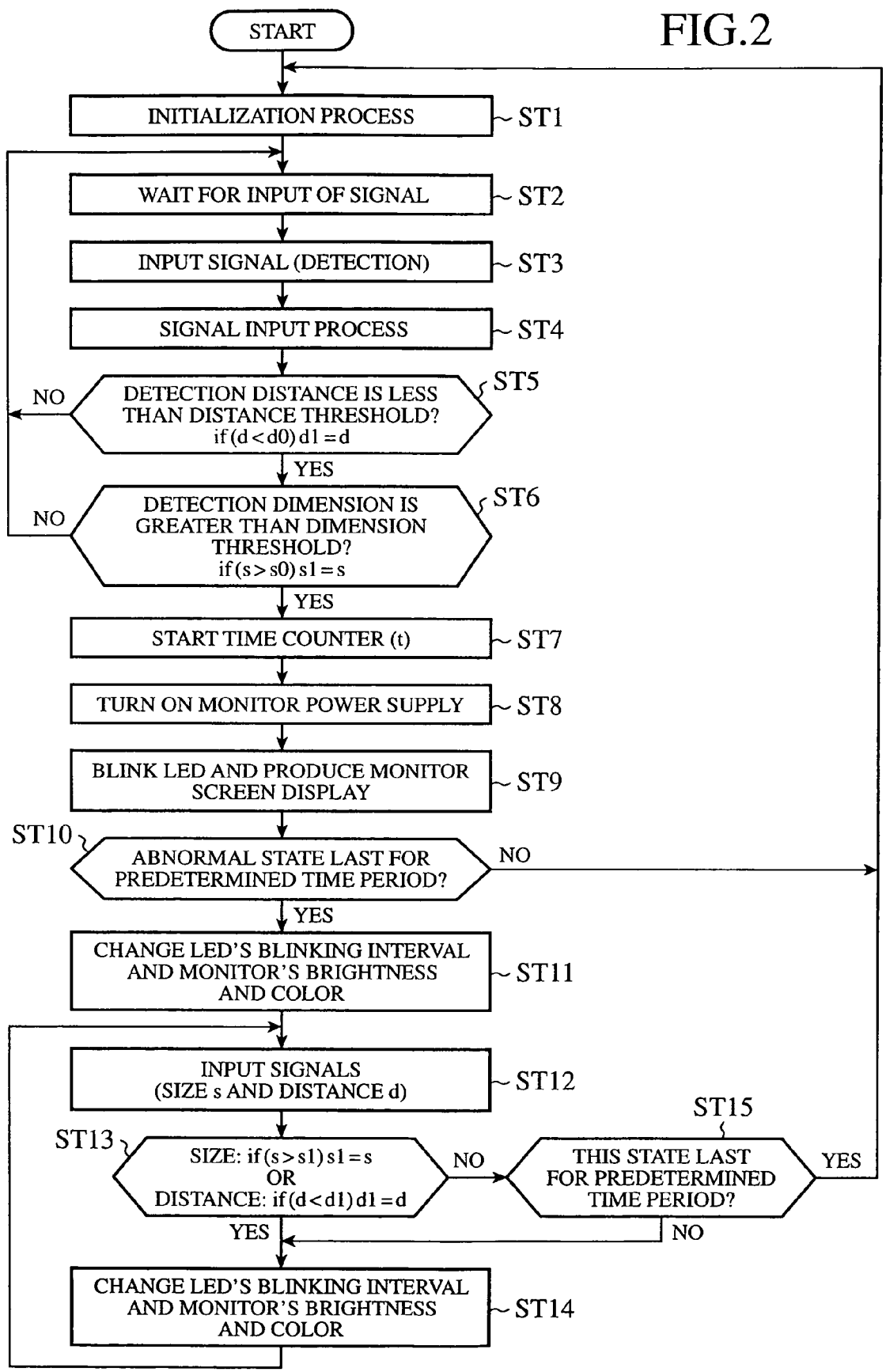
FIG. 2 is a flow chart for explaining the operation of the vehicle safety apparatus according to embodiment 1 of the present invention.

Next, a case where the vehicle safety apparatus 1 operates in the first mode will be explained with reference to the flow chart of FIG. 2. When the driver switches the ignition key off so as to lock the doors of the vehicle, as mentioned above, the main control unit 14 enters the first mode and then performs initialization processing (in step ST1). In this initialization processing, the main control unit 14 initializes (o resets) the time measurement unit 13 so that the detection unit 3 monitors surroundings of the vehicle.

The detection unit 3 estimates an apparent size (referred to as a detection dimension from here on) of an object (including a human being (a human being and an object are generically called objects from here on)) which is in the vicinity of the vehicle, and a distance between the vehicle and the object (referred to as a detection distance from here on). For example, the detection unit 3 performs image processing on an image signal picked-up by the camera so as to determine the detection dimension and detection distance of the object. As an alternative, the detection unit 3 can acquire the distance (i.e., the detection distance) between the vehicle and the object by receiving light reflected from the object by using an infrared sensor while moving the infrared sensor, and the apparent size of the object (i.e., the detection dimension) according to the area of a surface of the object that reflects incident infrared light.

A signal (i.e., a monitoring signal) from the detection unit 3 is provided to the signal determination unit 12 via the signal input unit 11. That is, the signal determination unit 12 enters a waiting state in which it waits for an input of a monitoring signal after the initialization processing is completed (in step ST2). When a monitoring signal is input (i.e., when determining that there is an input signal in step ST3), the signal determination unit 12 then performs signal input processing as follows (in step ST4).

Two or more pieces of state information are stored in the state storing unit 15 (for example, both first state information corresponding to the first mode and second state information corresponding to the second mode are stored in the state storing unit 15). Since the vehicle safety apparatus 1 is made to operate in the first mode now, the first state information is given from the state storing unit 15 to the signal determination unit 12.

The first state information includes a dimension threshold (i.e., a second threshold (s0)) indicating a lower limit of the dimension (i.e., the apparent size) of the object, and a distance threshold (i.e., a first threshold (d0)) indicating a lower limit of the distance between the vehicle and the object. First, the signal determination unit 12 compares the detection distance (d) with the distance threshold (d0), and then determines whether or not d<d0 (in a distance threshold determination process of step ST5). When determining that d>=d0, the signal determination unit 12 returns to step ST2.

On the other hand, when determining that d<d0, the signal determination unit 12 substitutes the detection distance (d) into d1 and stores it in the state storing unit 15, compares the detection dimension (s) with the dimension threshold (s0), and determines whether or not s>s0 (in a size threshold determination process of step ST6). When determining that s<=s0, the signal determination unit 12 returns to step ST2. On the other hand, when determining that s>s0, the signal determination unit 12 substitutes the detection dimension (s) into s1 and then stores it in the state storing unit 15. The signal determination unit 12 then triggers the time measurement unit 13 so as to cause it to start counting, and obtains a count value (t) from the time measurement unit 13 (in a time counter start process of step ST7).

The signal determination unit 12 sends an accident warning signal indicating that an accident can occur to the main control unit 14 (that is, when a positional relationship between the vehicle and the object reaches a predetermined reference one (i.e., a predetermined reference positional relationship is established between the vehicle and the object), the signal determination unit 12 starts the time measurement unit 13 and sends an accident warning signal to the main control unit 14). In response to the accident warning signal, the main control unit 14 controls the monitor power supply control unit 19 so as to supply electric power to the monitor 4 (in an electric power supply turning-on process of step ST8). After that, the main control unit 14 controls the blinking interval control unit 24 so as to blink the LED 6 while controlling the brightness control unit 21 so as to perform a screen display of the monitor 4 (in an LED blinking and monitor display process of step ST9).

Thus, the main control unit 14 performs LED blinking control and monitor display control. The signal determination unit 12 determines whether the state of d<d0 and s>s0 lasts for a predetermined time period (in step ST10). When then determining that the count value (t) exceeds the count threshold (t0) set in advance in the state of d<d0 and s>s0, the signal determination unit 12 sends out a time limit signal to the main control unit 14. On the other hand, when determining that the state of d<d0 and s>s0 does not last for the predetermined time period, the signal determination unit 12 resets the time measurement unit 13 and then returns to step ST1.

In response to the time limit signal, the main control unit 14 controls the blinking interval control unit 24 so as to change the blinking interval of the LED 6, and further controls the brightness control unit 21 so as to change at least one of the brightness and foreground color of the monitor 4 (in step ST11).

After that, the signal determination unit 12 acquires the detection distance d and the detection dimension s again from the monitoring signal sent thereto from the detection unit 3, as mentioned above (in step ST12), and then compares the detection distance d and the detection dimension s with the distances d1 and s1 stored in the state storing unit 15, respectively, so as to determine whether or not s>s1 and whether or not d<d1 (instep ST13). When determining that s>s1 or d<d1, the signal determination unit 12 sends an accident occurrence signal to the main control unit 14.

In response to the accident occurrence signal, the main control unit 14 controls the blinking interval control unit 24 again so as to change the blinking interval of the LED 6 again, and then controls the brightness control unit 21 so as to change at least one of the brightness and foreground color of the monitor 4 again (in step ST14). The main control unit 14 then returns to step ST12.

On the other hand, when determining that s<=s1 and d<=d1, the signal determination unit 12 triggers the time measurement unit 13 to start counting and acquires a count value (t). The signal determination unit 12 further determines whether the state of s<=s1 and d>=d1 lasts for a predetermined period time (t1: t1<t0) (in step ST15). When determining that the state of s<=s1 and d>=d1 lasts for the predetermined period time (t1), the signal determination unit 12 returns to step ST1. On the other hand, when determining that the state of s<=s1 and d>=d1 does not last for the predetermined period time (t1), the signal determination unit 12 shifts above-mentioned step ST14 in which the main control unit changes at least one of the brightness and foreground color of the monitor 4 again.

In the second mode, although the main control unit performs control in the same manner that it does in the first mode, the dimension threshold and distance threshold which are used in the second mode may differ from those used in the first mode. That is, the above-mentioned second state information is used in the second mode. The signal determination unit 12, the main control unit 14, the monitor power supply control unit 19, the brightness control unit 21, and the blinking interval control unit 24 collectively function as a control means, as can be seen from the above-mentioned explanation.

As mentioned above, according to this embodiment 1, when an object approaches the vehicle and is at a distance from the vehicle which is shorter than a distance threshold, and the apparent size of this object exceeds a dimension threshold, the vehicle safety apparatus makes the LED blink. Furthermore, when this state (i.e., a state in which the object is close to the vehicle) lasts for a predetermined time period, the vehicle safety apparatus produces a monitor screen and changes the blinking interval of the LED, and changes at least one of the brightness and foreground color of the monitor screen. Therefore, since the vehicle safety apparatus can issue a warning or the like before any accident occurs in the vehicle, the vehicle safety apparatus can not only prevent a theft of the vehicle effectively but also give advance notice of a positional relationship between the vehicle and an object that is approaching the vehicle so as to ensure the safety of the vehicle.

In addition, according to the embodiment 1, since the vehicle safety apparatus changes the blinking interval of the LED again and changes at least one of the brightness and foreground color of the monitor screen when an object further approaches the vehicle after issuing a warning as mentioned above, the vehicle safety apparatus can effectively give a warning to the object.

Embodiment 2

Figure 3:
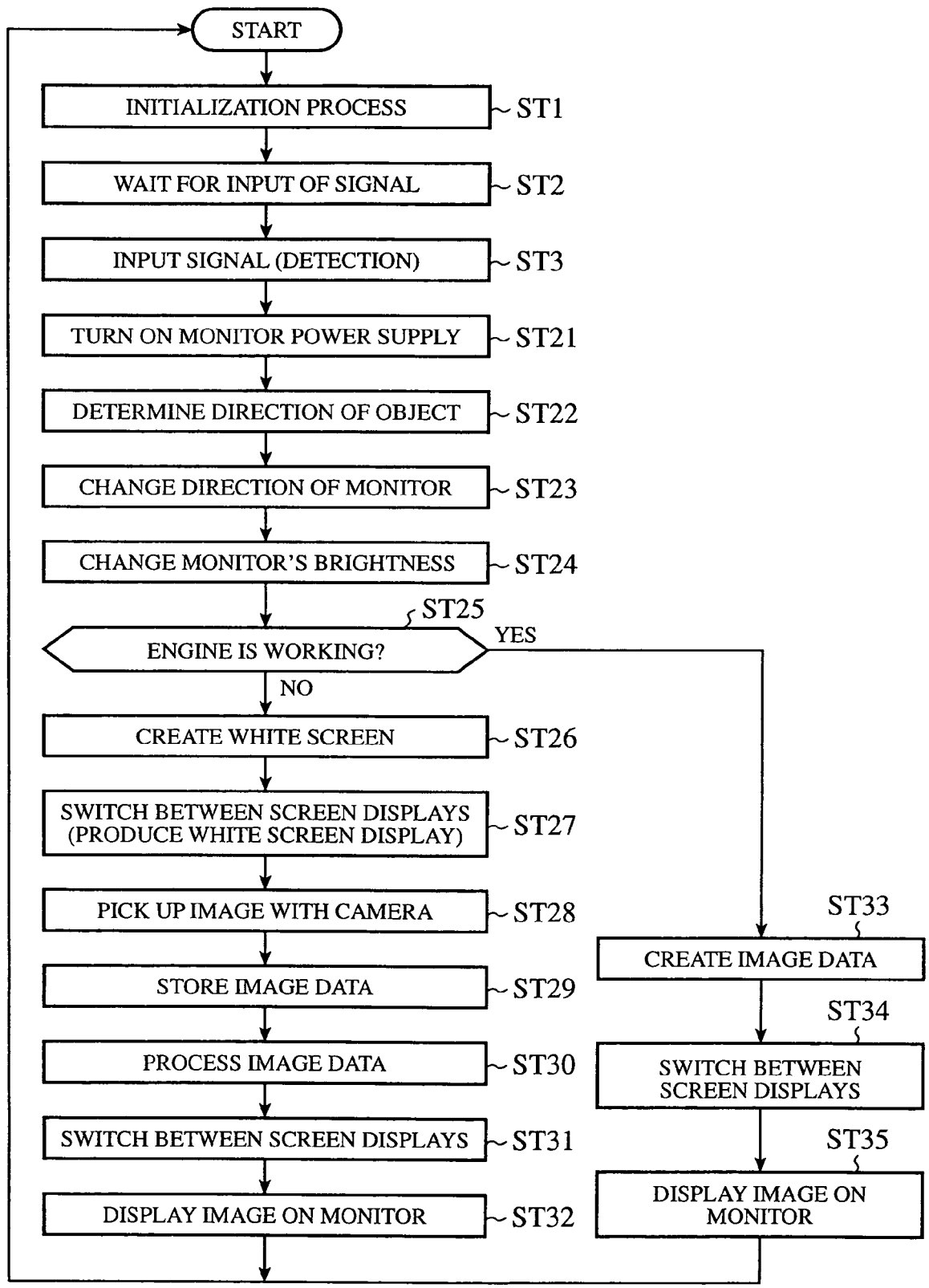
FIG. 3 is a flow chart for explaining the operation of a vehicle safety apparatus according to embodiment 2 of the present invention.

FIG. 3 is a flow chart for explaining the operation of a vehicle safety apparatus according to embodiment 2 of the present invention. In FIG. 3, the same steps as shown in FIG. 2 are designated by the same reference numerals. In step ST3 of FIG. 3, when there is an input of a monitoring signal, a signal determination unit 12 notifies an input of the monitoring signal to a main control unit 14. As a result, the main control unit 14 controls a monitor power supply control unit 19 so as to supply electric power to a monitor 4 (in a monitor power supply turning-on process of step ST21). Two or more detection units 3 are disposed, and the signal determination unit 12 determines the direction of an object with respect to the vehicle according to positions where the two or more detection units each of which sends a monitoring signal to the signal determination unit 12 are respectively arranged (in a detection direction determination process of step ST22), and sends out an object direction signal indicating the direction of the object to the main control unit 14.

Figure 4:
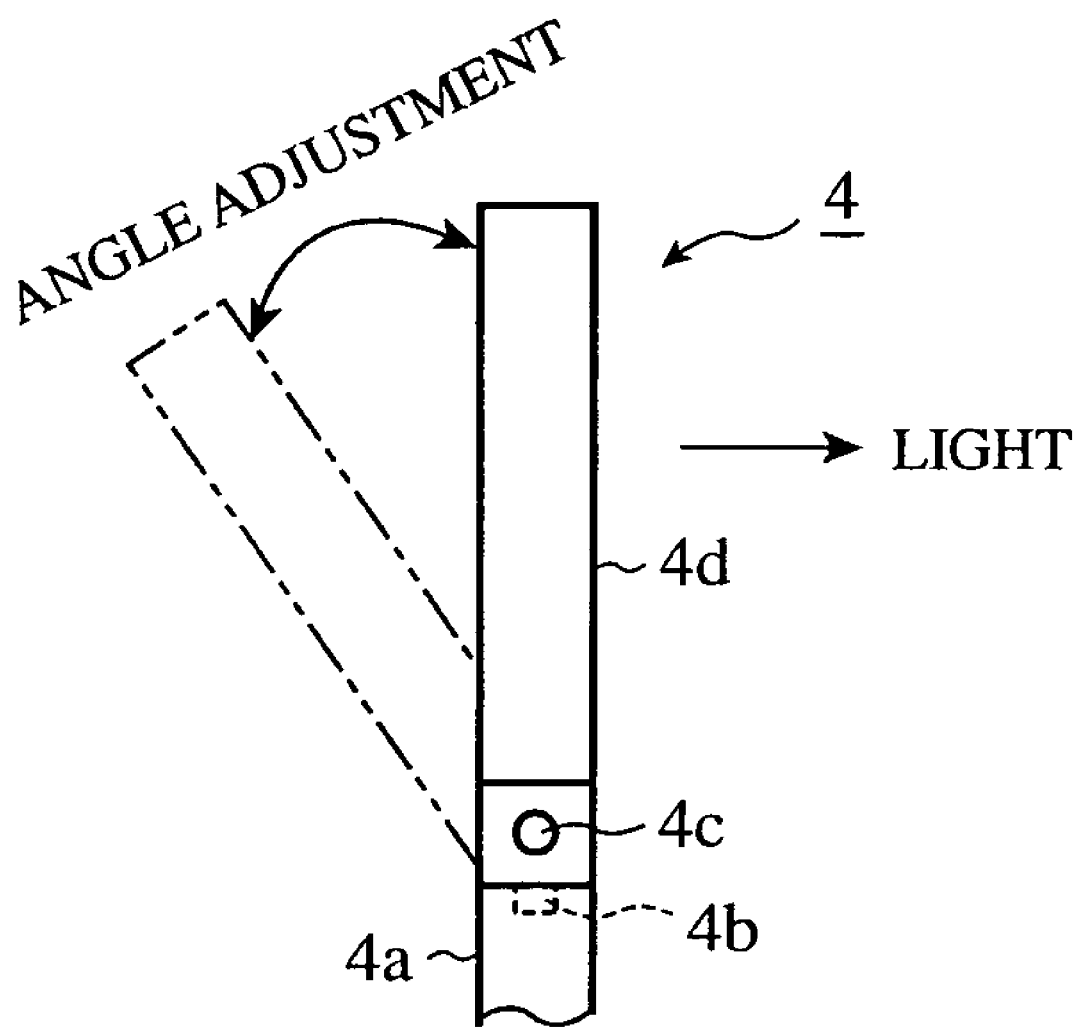
FIG. 4 is a diagram schematically showing the structure of a display unit (or a monitor) for use in the vehicle safety apparatus according to embodiment 2 of the present invention.

As shown in FIG. 4, while the monitor 4 is rotatably attached around an axis 4b extending on a holding base 4a and in upward and downward directions, the monitor 4 is rotatably attached around another axis 4c extending in a direction from back to front of the figure. While the monitor 4 can be rotated around the axis 4b and the direction of a display screen 4d can be changed by a driving unit (not shown) disposed at a lower end of the monitor 4, an angle adjustment is carried out by rotating the monitor 4 around the other axis 4c so that the display screen 4d of the monitor 4 can be oriented in an arbitrary direction. That is, the attitude of the monitor 4 can be changed in three dimension (attitude control).

According to the object direction signal from the signal determination unit 12, the main control unit 14 performs control of the attitude of the monitor 4 by using a direction control unit 22, and aims the display screen 4d of the monitor 4 to the direction of the object (in a monitor direction changing process of step ST23). After that, the main control unit 14 controls a brightness control unit 21 so as to cause the brightness control unit 21 to change the brightness of the monitor 4 to an optimal setting (in a monitor brightness changing process of step ST24).

Then, the main control unit 14 determines whether or not the engine of the vehicle is being driven (in step ST25), and, when determining that the engine is not being driven, determines that the vehicle is stopping or parking and there is the fear of a theft of the vehicle, controls a white screen creation unit 18 so as to produce a white image (in step ST26), and produces a white screen display on the monitor 4 via a display switching unit 20 (in a screen switching process of step ST27).

Since the monitor display oriented in the direction of the object functions as a flash, as mentioned above, the main control unit 14 controls a camera control unit 23 according to the object direction signal from the signal determination unit 12 so as to cause the camera control unit 2 to aim a camera 5 at the object, and picks up an image of the object so as to acquire picked-up image data (in a camera image pickup process of step ST28). This picked-up image data is then delivered to the main control unit 14 via the camera control unit 23, and is stored in an image storing unit 16 of the main control unit 14 (in step ST29).

After that, the main control unit 14 sends both the picked-up image data stored in the image storing unit 16 and image data pre-stored in the image storing unit 16 to an image composition unit 17, and causes the image composition unit 1 to combine (or process) the pre-stored image data and the picked-up image data so as to obtain composite image data (in an image data process of step ST30). The main control unit 14 then causes a display switching unit 20 to switch between screen displays (in a screen switching process of step ST31) so as to display the composite image data generated by the image composition unit 17 on the monitor 4 (in step ST32). As a result, when the object is a human being, the vehicle safety apparatus according to embodiment 2 can prevent the vehicle from theft or the like by threatening him or her before damage is inflicted on the vehicle.

On the other hand, when determining that the engine is being driven in step ST25, the main control unit 14 determines that an object (for example, another vehicle) is approaching the vehicle while the vehicle is traveling, selectively performs step ST26 and steps ST28 to ST30, generates image data (in step ST33), causes the display switching unit 20 to switch between screen displays (in a screen switching of step ST34), and displays the image data on the monitor 4 (in step ST35). As a result, the vehicle safety apparatus gives a warning to the object, such as another vehicle, so as to ensure the safety of the vehicle. It is apparent from the above explanation that the signal determination unit 12, the main control unit 14, the image storing unit 16, the image composition unit 17, the white screen creation unit 18, the monitor power supply control unit 19, the direction control unit 22, and the camera control unit 23 collectively function as a control means.

As mentioned above, according to this embodiment 2, the vehicle safety apparatus issues a warning by aiming a monitor's screen to an object (for example, a human being or another vehicle) and displaying an image on the screen of the monitor. Therefore, because the vehicle safety apparatus can give a warning or the like before an accident occurs on the vehicle, the vehicle safety apparatus can not only prevent the vehicle from theft effectively and can also give advance notice of a positional relationship between the vehicle and the object, thereby ensuring the safety of the vehicle.

Embodiment 3

Figure 5:
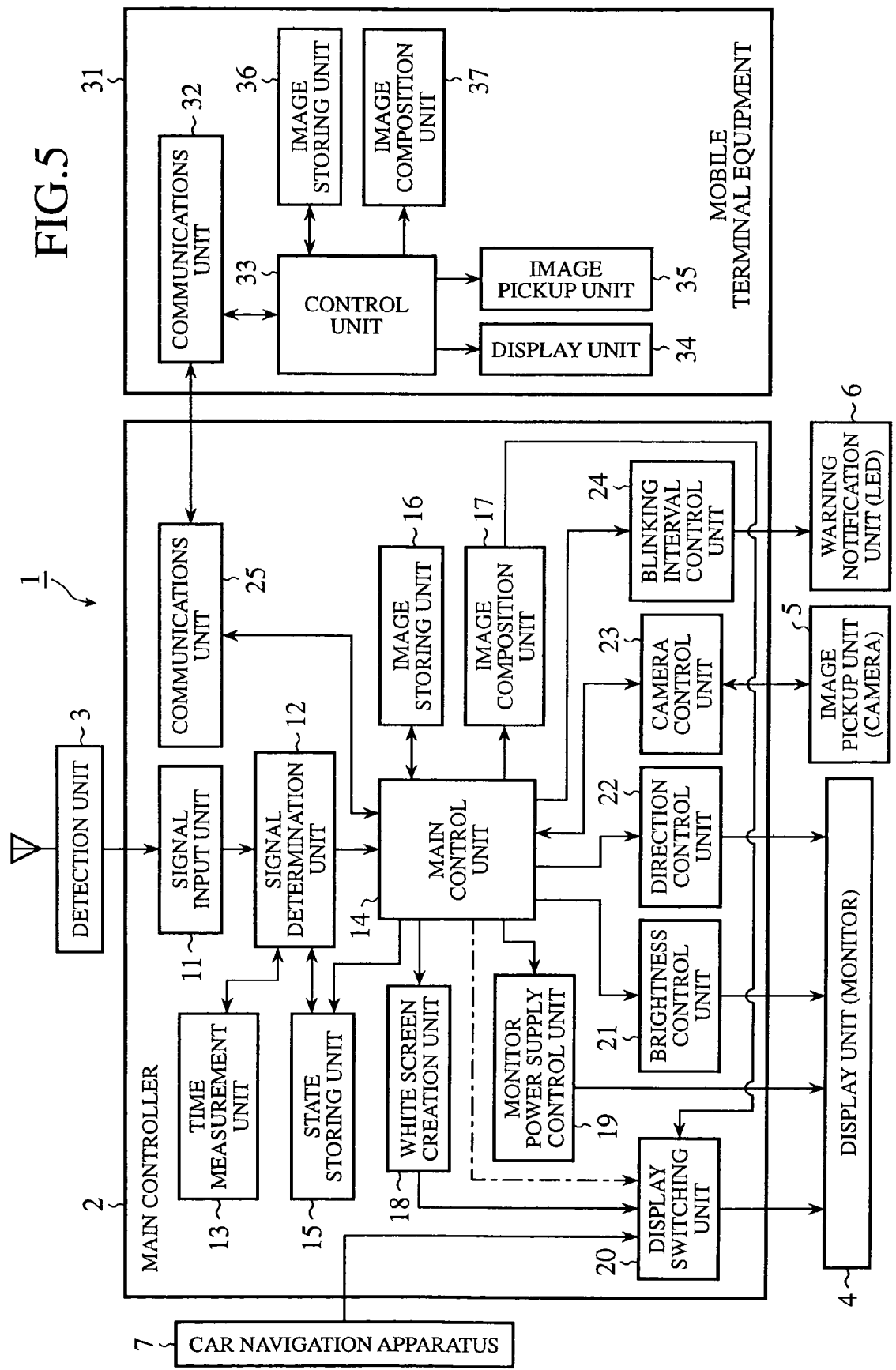
FIG. 5 is a block diagram showing a vehicle safety apparatus according to embodiment 3 of the present invention and mobile terminal equipment.
Figure 6:
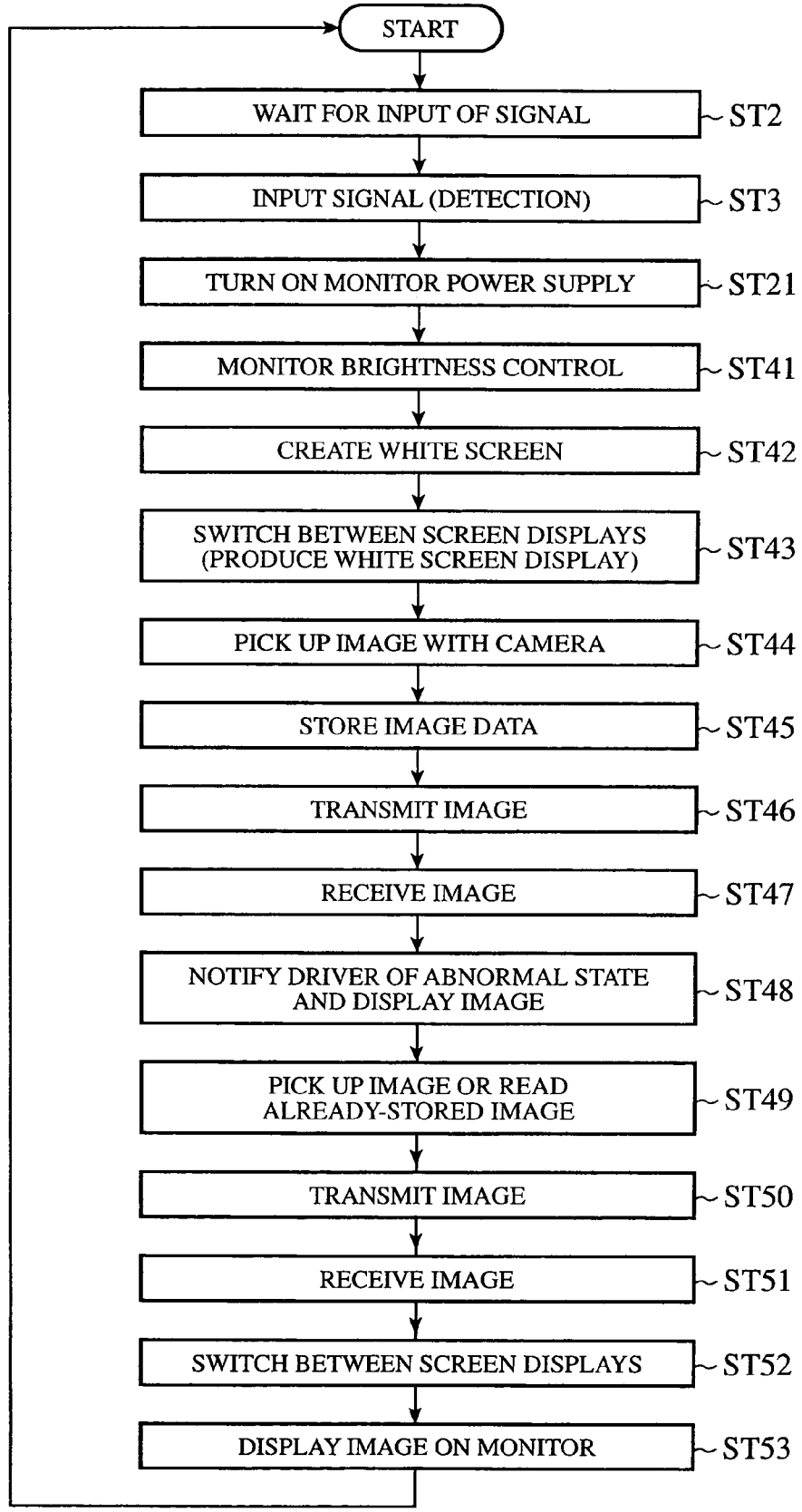
FIG. 6 is a flow chart for explaining the operation of the vehicle safety apparatus according to embodiment 3 of the present invention.

FIG. 5 is a block diagram showing a vehicle safety apparatus according to embodiment 3 of the present invention and mobile terminal equipment, and FIG. 6 is a flow chart for explaining the operation of the vehicle safety apparatus according to embodiment 3 of the present invention. In FIG. 5, the same components as shown in FIG. 1 are designated by the same reference numerals. In FIG. 6, the same steps as shown in FIG. 3 are designated by the same reference numerals. In embodiment 1, no explanation of the communications unit 25 as shown in FIG. 1 is made. In the vehicle safety apparatus according to embodiment 3, a communications unit 25 operates in such a manner as mentioned below.

When a monitor power supply is turned on in step ST21, a signal determination unit 12 sends an object direction signal indicating the direction of an object to a main control unit 14, as previously explained with reference to FIG. 3. The main control unit 14 then controls a direction control unit 22 according to the object direction signal from the signal determination unit 12, and controls the attitude of a monitor 4 by using the direction control unit 22 so as to aim the display screen of the monitor 4 at the direction of the object. The main control unit 14 further changes the brightness of the monitor 4 to an optimal setting by using a brightness control unit 21 (in a monitor brightness control process of step ST41).

Then, the main control unit 14 controls a white screen creation unit 18 to cause the white screen creation unit 18 so as to produce a white image (in step ST42) and produces a white screen display on the monitor 4 via a display switching unit 20 (in a screen switching process of step ST43). The main control unit 14 further controls a camera control unit 23 according to the object direction signal so as to cause the camera control unit 23 to aim a camera 5 at the direction of the object, and picks up an image of the object by using the monitor 4 as a flash so as to acquire picked-up image data (in a camera pickup process of step ST44). This picked-up image data is then delivered to the main control unit 14 via the camera control unit 23 and is stored in an image storing unit 16 of the main control unit 14 (in step ST45).

After that, the main control unit 14 starts the communications unit 25 so as to call a predetermined calling destination, and then communicates with this called station. For example, the predetermined calling destination can be the mobile terminal equipment (i.e., a mobile phone) 31 which the driver of the vehicle or the like can carry.

As shown in FIG. 5, the mobile terminal equipment 31 is provided with a communications unit 32, a control unit 33, a display unit (or display) 34, an image pickup unit (for example, a camera) 35, an image storing unit 36, and an image composition unit 37. When the mobile terminal equipment 31 responds to a call from the vehicle safety apparatus 1, the main control unit 14 reads the picked-up image data from the image storing unit 16, and then transmits the picked-up image data to the mobile terminal equipment 31 by way of the communications unit 25 (in an image transmission process of step ST46).

The mobile terminal equipment 31 receives the picked-up image data by way of the communications unit 32 (in an image reception process of step ST47), and then delivers the received picked-up image data to the control unit 33. The control unit 33 displays an image responding to the received picked-up image data on the display unit 34, and notifies the occurrence of an accident to the driver (in a notification and display process of step ST48). When the driver is notified of the occurrence of an accident, he or she can recognize that an accident can occur in the vehicle. The driver thus can take the following measures.

Image data which the driver has inputted in advance are already stored in the image storing unit 36. When the driver operates an input unit (not shown) of the mobile terminal equipment 31 so as to select desired image data from the image data stored in the image storing unit 36 (in an image pickup or already-stored image reading process of step ST49), and then pushes a transmission button (not shown), the control unit 33 sends the selected image data to the vehicle safety apparatus 1 via the communications unit 32 (in an image transmission process of step ST50).

When the vehicle safety apparatus 1 receives the selected image data, as received image data, by way of the communications unit 25 (in an image reception process of step ST51), the main control unit 14 causes the display switching unit 20 to switch between screen displays (in a screen switching process of step ST52), and displays the received image data on the monitor 4 (in step ST53). As a result, when the object is a human being, the vehicle safety apparatus according to embodiment 3 can prevent the vehicle from theft or the like by threatening him or her before damage is inflicted on the vehicle. Furthermore, the driver can recognize that an accident can occur in the vehicle, as previously mentioned.

In above-mentioned step ST49, the driver can alternatively be allowed to operate the not-shown input unit of the mobile terminal equipment 31 so as to start the image pickup unit 35 to cause the image pickup unit 35 to pick up an image of a desired scenery or the like and produce picked-up image data, and to transmit the picked-up image data, as the selected image data, to the vehicle safety apparatus 1. As an alternative, the image composition unit 37 can combine the picked-up image data that is thus obtained by the image pickup unit 35 and image data stored in the image storing unit 36 so as to produce composite image data, and then transmit the composite image data, as the selected image data, to the vehicle safety apparatus 1.

As mentioned above, according to this embodiment 3, the vehicle safety apparatus can pick up an image of an object (for example, a human being or another vehicle) and then transmit picked-up image data to mobile terminal equipment, such as a mobile phone, which the driver carries so as to notify the driver that there is a possibility that an accident occurs in the vehicle when the driver leaves the vehicle, the driver can recognize that an accident can occur in the vehicle before an accident actually occurs, and therefore can take measures directed toward the prevention of theft or the like of the vehicle.

In addition, according to the embodiment 3, the driver who is notified that there is a possibility that an accident occurs in the vehicle can operate the mobile terminal equipment so as to display a desired image on the monitor of the vehicle safety apparatus and give a warning to the object. As a result, the vehicle safety apparatus can effectively prevent the vehicle from theft or the like.

Therefore, the vehicle safety apparatus can not only prevent the vehicle from theft effectively and can also give advance notice of a positional relationship between the vehicle and the object, thereby ensuring the safety of the vehicle.

Many widely different embodiments of the present invention may be constructed without departing from the spirit and scope of the present invention. It should be understood that the present invention is not limited to the specific embodiments described in the specification, except as defined in the appended claims.

What is claimed is:

1. A vehicle safety apparatus comprising:
   a detection means for detecting an approach of an object to a vehicle;
   a warning means for giving a warning to said object; and
   a control means for starting said warning means when said detection means detects an approach of said object to said vehicle and a distance between said vehicle and said detected object reaches a predetermined value,
   wherein said control means starts said warning means when said detection means detects an occurrence of an abnormal state in which said distance between said detected object and said vehicle is less than a first predetermined threshold and said detected object has an apparent size larger than a second predetermined threshold.

2. The vehicle safety apparatus according to claim 1, wherein said warning means is a light means for emitting light and said control means changes a blinking interval of said light means when the abnormal state lasts for a predetermined time period.

3. The vehicle safety apparatus according to claim 2, further comprising a monitor means for displaying an image, and said control means turns on said monitor means when detecting an occurrence of an abnormal state, and changes at least one of brightness and foreground color of said monitor means when said abnormal state lasts for the predetermined time period.

4. The vehicle safety apparatus according to claim 1, further comprising a monitor means for displaying an image, and said control means turns on said monitor means when detecting an occurrence of an abnormal state, and changes at least one of brightness and foreground color of said monitor means when said abnormal state lasts for the predetermined time period.

5. The vehicle safety apparatus according to claim 1, wherein said distance between said vehicle and said detected object is a distance between a current location of said vehicle and a current location of said detected object.

6. A vehicle safety apparatus comprising:
   a detection means for detecting an approach of an object to a vehicle;
   a warning means for giving a warning to said object; and
   a control means for starting said warning means when said detection means detects an approach of said object to said vehicle and a distance between said vehicle and said detected object reaches a predetermined value,
   wherein said warning means is a monitor means for displaying an image, said monitor means including a display unit for displaying said image and a holding means for variably holding a direction of said display unit in three dimension, and, when said detection means detects an approach of an object, said control means turns on said monitor means and performs drive control of said holding means so as to aim said display unit at said detected object, and changes at least one of brightness and foreground color of said monitor means.

7. The vehicle safety apparatus according to claim 6, further comprising an image pickup means for picking up an image so as to obtain image data, and said control means determines whether or not an engine of said vehicle is working, causes said display unit to produce a white screen display and also causes said image pickup means to pick up an image by using said display unit as a flash, and displays the image on said display unit based on the obtained image data.

8. The vehicle safety apparatus according to claim 7, wherein said control means displays an image based on image data pre-stored therein when determining that the engine of said vehicle is working.

9. The vehicle safety apparatus according to claim 6, further comprising a communications means for carrying out communications with mobile terminal equipment, and, when said detection means detects an approach of an object, said control means controls said communications means so as to notify the detection of the approach of an object to said mobile terminal equipment.

10. The vehicle safety apparatus according to claim 9, further comprising an image pickup means for picking up an image so as to obtain image data, and said control means causes said display unit to produce a white screen display and also causes said image pickup means to pick up an image by using said display unit as a flash, and transmits said obtained image data to said mobile terminal equipment via said communications means.

11. The vehicle safety apparatus according to claim 10, wherein said apparatus receives image data generated by said mobile terminal equipment via said communications means, and said control means displays an image corresponding to said received image data on said display unit.

* * * * *